Feb. 21, 1939.　　　J. J. DOWLING　　　2,147,969
APPARATUS FOR DETERMINING THE QUANTITY OF CONSTITUENTS IN GASES
Filed Feb. 19, 1936

Inventor
John J. Dowling,
By Glascock Downing & Seebold
Attys.

Patented Feb. 21, 1939

2,147,969

UNITED STATES PATENT OFFICE 2,147,969

APPARATUS FOR DETERMINING THE QUANTITY OF CONSTITUENTS IN GASES

John Joseph Dowling, Dublin, Irish Free State

Application February 19, 1936, Serial No. 64,739
In Great Britain February 23, 1935

1 Claim. (Cl. 23—254)

This invention relates to apparatus for determining the quantity of one or more of the constituents in samples of air, flue, or other gases.

It has been previously proposed to provide an apparatus for this purpose comprising a chamber provided with a pressure gauge and which is adapted to measure off a known volume of the air or gas to be tested, and having a re-agent or substance, which will absorb one of the constituents of the air gas within said chamber. The absorption of said constituent results in a decrease in the pressure within the chamber and the pressure gauge indicates the decrease in pressure and therefore the amount of the said constituent formerly present in the air or gas within the chamber.

The object of the present invention is to provide an improved and simplified apparatus for the purpose set forth and which will be easy to operate and which will have no parts liable to get out of order.

The invention will now be described by way of example with reference to the accompanying drawing, in which:—

Figure 1:
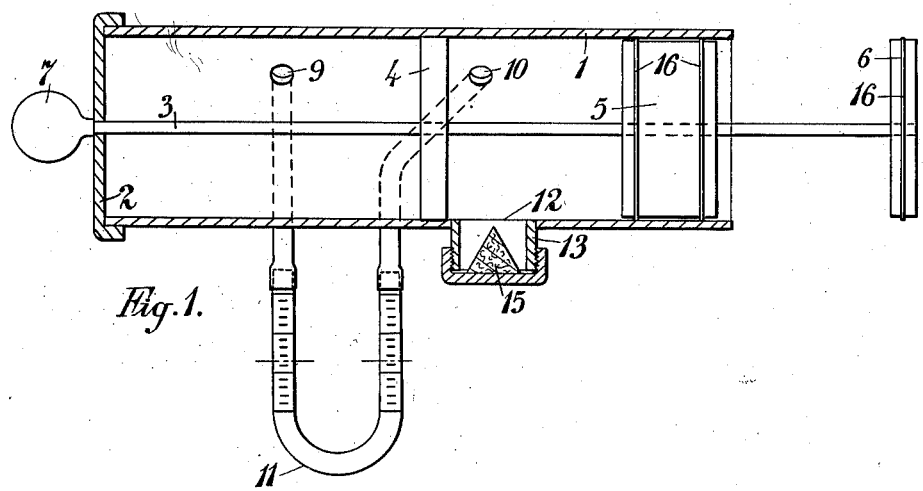
Figure 1 is a sectional elevation of the device open.
Figure 2:
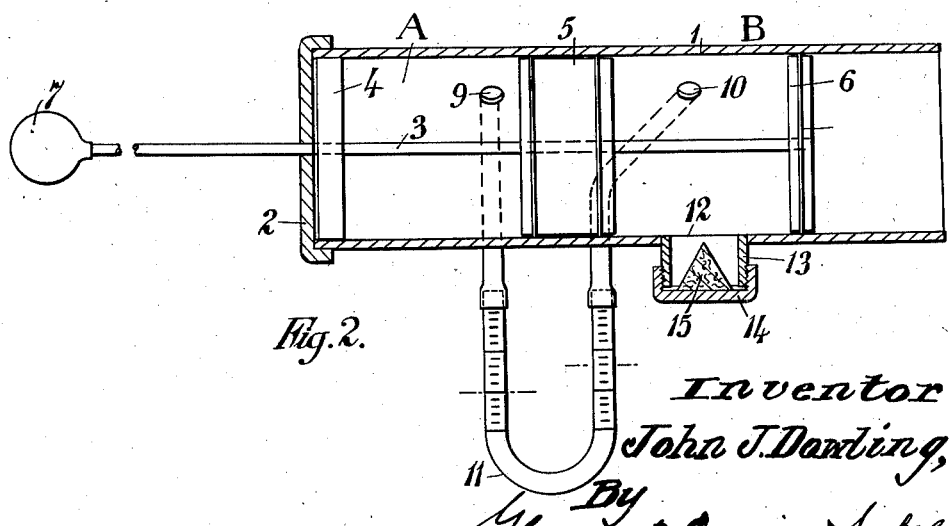
Figure 2 shows the device in Figure 1 closed.

In carrying the invention into effect according to the form shown in Figures 1 and 2, for the determination of a single constituent, a cylinder 1, formed of a piece of tubing of metal, glass or the like is closed at one end by a cover 2 and left open at the other. The cover is provided with a central hole through which passes freely the piston rod 3 to which are attached three pistons 4, 5 and 6 equally spaced along the rod. A handle 7 is attached to the piston rod 3 and serves also as a stop to limit the movement so that the end piston 6 will extend beyond the cylinder and the second piston 5 will just be flush with the open end of the cylinder 1 in its extreme position as shown in Figure 1 in which the device is in the open position.

The piston 5 is made sufficiently wide so that it will completely cover over the aperture 12 as it slides along. Further, the position of the aperture must be such that it is not opened to be in communication with the chamber B until the piston 6 has entered the cylinder 1 otherwise absorption would take place without affecting the manometer gauge.

The extreme position in the opposite direction or the closed position as shown in Figure 2 is such that the end piston 6 is just wholly within the cylinder 1. In this position there are two chambers A and B formed by the three pistons and the two chambers are provided with orifices 9, 10 respectively which are connected by tubes to a U tube or manometer 11 filled with a liquid other than water, such for instance as oil.

The chamber B nearest the open end is provided with an aperture or opening 12 on the underside of the cylinder when the cylinder is horizontal and is provided with a cylindrical flange 13 around said opening which is screwed to receive a cap 14 or the like forming a receptacle. The said cap 14 is provided with a chemical absorbing agent or deliquescent material 15, such as fused calcium chloride for instance, for determining moisture. Any other agent may be employed.

The centre piston 5 and the end piston 6 remote from the handle 7 are provided with suitable packing rings 16 of leather, rubber or other suitable material so that the constant volume or drying chamber B which they form in the cylinder is air-tight. The inner piston 4 is a good fit in the cylinder but is not air-tight. It may be ground to prevent air circulating past but will not maintain any pressure and will thus ensure equilibrium of the manometer gauge.

In operation the handle 7 is pushed down against the cylinder cover so that the end piston 6 is in its extreme position to bring the device to the open position and the inner piston 4 is situated between the two entrances to the manometer 11 and prevents access of damp air to the drying agent. The pistons are then pulled in and a volume of damp air from the atmosphere is drawn into the drying chamber B between the pistons 5 and 6 thus connecting the ends of the manometer to the drying chamber B and the other chamber A respectively. Water vapour is then absorbed from the volume of air in the chamber B and the liquid rises in the U tube 11 indicating the drop in pressure which is directly proportional to the amount of water vapour. It is an easy matter to graduate the U tube 11 to read in actual humidities or quantities of water vapour present.

The volume of air between the pistons 4 and 5 is maintained substantially free of moisture. If the outer atmosphere had direct access to the chemical absorbing agent or deliquescent material 15, this agent or material would soon become ineffective. The pistons 4 and 5, however, maintain a volume of substantially moisture free air therebetween and in consequence the said agent or material is not impaired to any or only impaired to a very slight extent by any moisture which may be present in said volume of air. If any moisture is extracted from the volume of air between the pistons 4 and 5 this will not effect the manometer gauge as the slight air leakage around piston 4 will maintain an equal pressure on both sides of the piston 4.

By connecting one side of the manometer gauge to the orifice 9 both sides of the manometer are supported which is preferred to supporting it at one side only and leaving the other side directly open to atmosphere.

If desired, some stirring device could be incorporated in the drying chamber to facilitate the speed of absorption of the moisture and thus increase the speed of examining samples.

The device can be used under any conditions of temperature, barometric pressure, or calm or stormy weather for determining moisture content. The more windy the weather the more reliable will be the samples taken and the results obtained.

For consistency in readings it is necessary that the pistons 5 and 6 forming the constant volume chamber are airtight and that the size of the chemical agent 15 is always the same. The chemical agent is therefore made in blocks of standard size which can be replaced, if required. Similarly, the dimensions of the manometer tube, the cylinders, pistons and their spacing must always be standardised for replacements to obtain accurate results. Care must be taken to allow the device to reach temperature equilibrium with its surroundings before taking observations.

The inverse process can be used namely by placing a substance which will evaporate in the receptacle and then filling the constant volume chamber with a sample of gas or air having known constituents. The substance will evaporate and the pressure in the chamber will increase. The pressure readings will give the quantity of substance or its vapour which has been taken into the sample.

In determining the amount of moisture in a block of peat or tobacco, for instance, a cavity or hole is made in the block and then the piston of the device is inserted into the cavity while a suitable shield or cover is placed around the cavity so as to protect the cavity from the outside air. The sample of air taken into the constant volume chamber will therefore have a moisture content proportional to the moisture in the block. The moisture content in the sample of air is then read off by the graduations upon the U tube gauge.

It will be observed that temperature and barometric pressure have no effect upon the device and that the device will give direct readings under all conditions.

It is to be understood that the device may be made in different forms from that described without departing from the scope of the invention. For instance the apparatus may be made to operate vertically and the handle may be situated upon the piston at the open end of the tube. Instead of a U tube or manometer a direct reading gauge recording the pressure might be used. Various other arrangements may be made to suit the conditions under which the device is to be used.

What I claim is:

An apparatus for determining the quantity of one of the constituents in samples of air, flue or other gas, comprising a cylindrical vessel, a piston rod extending therethrough, three pistons secured to said rod at spaced distances apart so that when all three are drawn within the vessel two constant volume compartments are formed, one on each side of the middle piston, a receptacle for holding a re-agent to react with the constituent to be measured, said receptacle communicating with one of said compartments when the pistons are all within the vessel and a pressure gauge likewise communicating with said compartment, the movement of the pistons from a position where one of the end pistons is exterior to the vessel to a position wherein all are within the vessel, resulting in a known volume of air, flue or other gas being automatically segregated without altering its pressure, density or temperature, the said volume when segregated being in communication with the re-agent and the subsequent alteration in pressure, as shown by the pressure gauge, indicating the change in volume due to the action of the re-agent on the constituent to be measured.

JOHN JOSEPH DOWLING.